M. ADAIR AND W. P. SNYDER.
MACHINE FOR HEMSTITCHING FABRICS.
APPLICATION FILED MAR. 29, 1911. RENEWED MAR. 18, 1921.

1,394,244.

Patented Oct. 18, 1921.

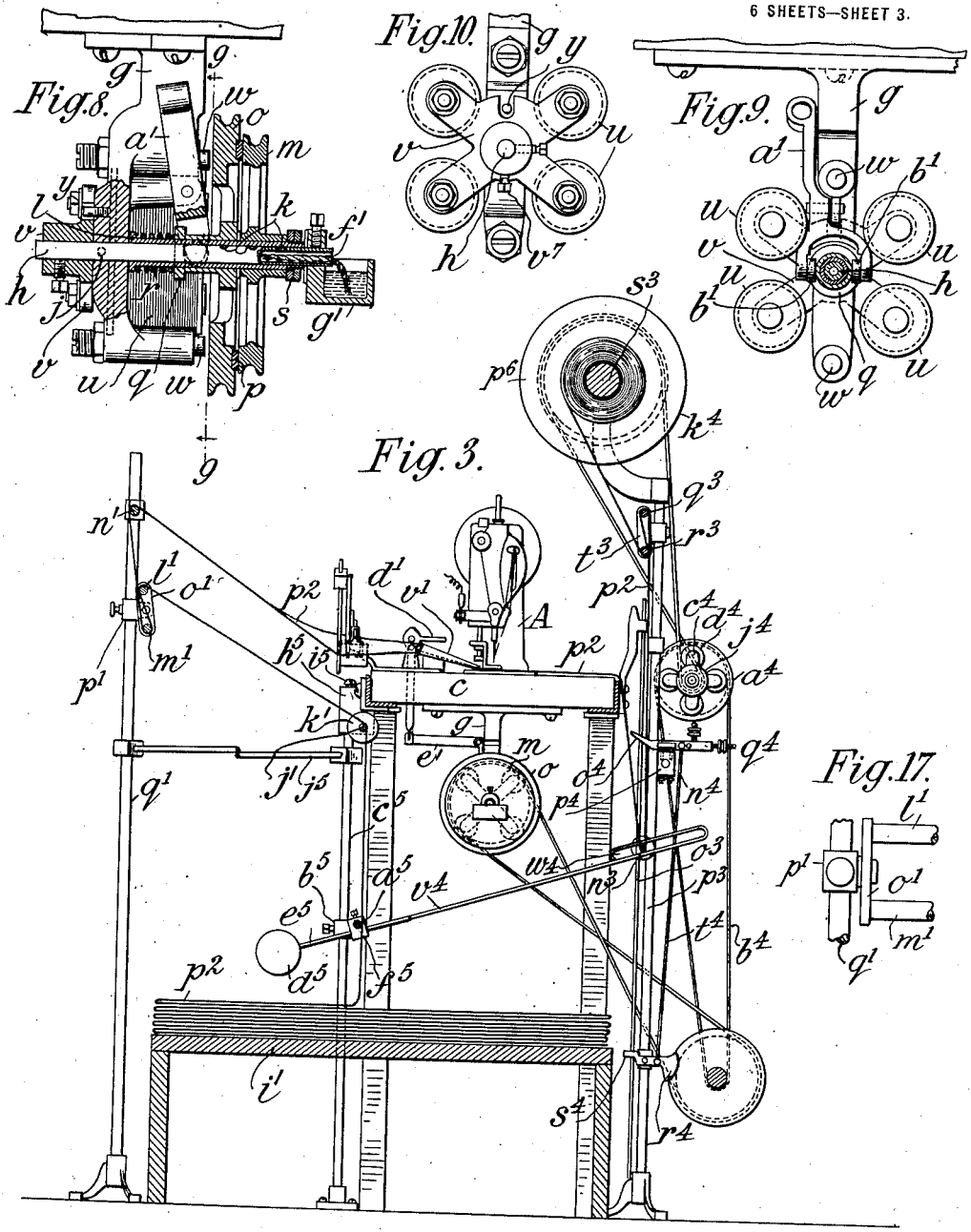

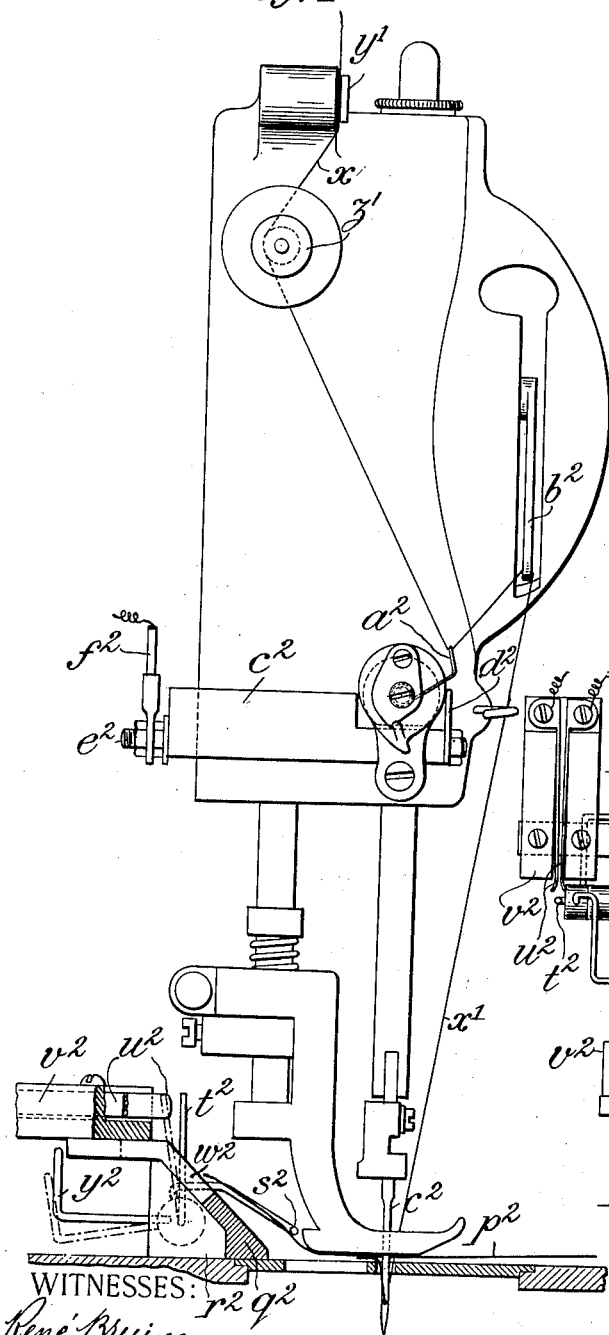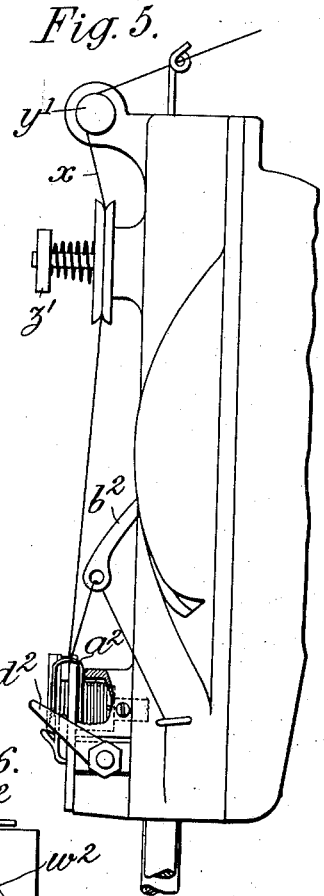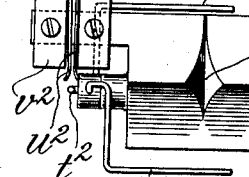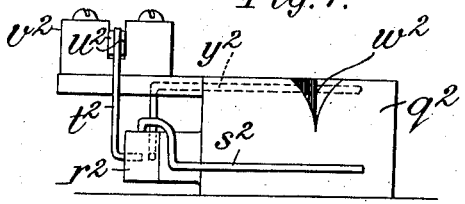

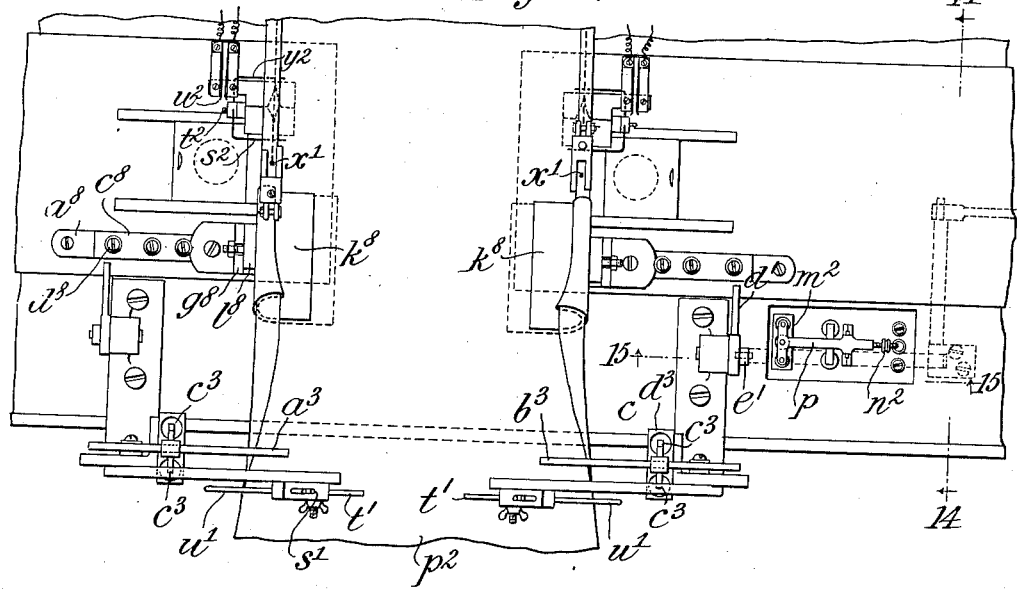
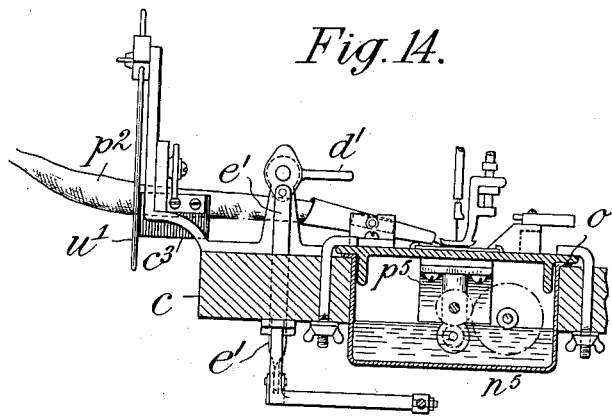
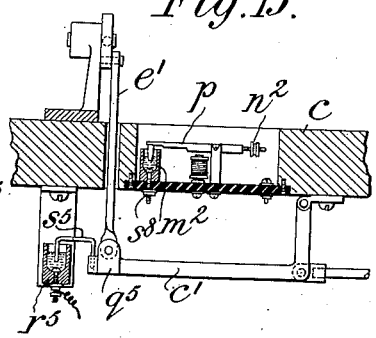
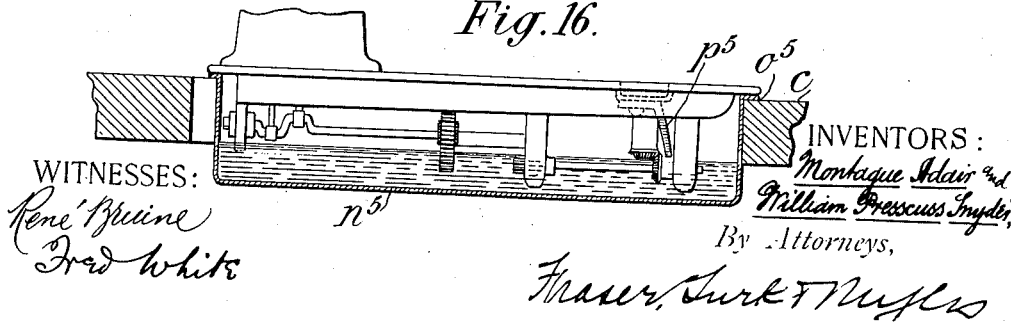

M. ADAIR AND W. P. SNYDER.
MACHINE FOR HEMSTITCHING FABRICS.
APPLICATION FILED MAR. 29, 1911. RENEWED MAR. 18, 1921.

1,394,244.

Patented Oct. 18, 1921.

WITNESSES:
René Bruine
Fred White

INVENTORS:
Montague Adair and
William Pressauss Snyder,
By Attorneys,
Fraser Burk & Myers

UNITED STATES PATENT OFFICE.

MONTAGUE ADAIR, OF BROOKLYN, AND WILLIAM PRESSCUSS SNYDER, OF NEW YORK, N. Y., ASSIGNORS TO ADAIR MACHINE COMPANY, OF BROOKLYN, NEW YORK, A CORPORATION OF NEW YORK.

MACHINE FOR HEMSTITCHING FABRICS.

1,394,244.     Specification of Letters Patent.     Patented Oct. 18, 1921.

Application filed March 29, 1911, Serial No. 617,594. Renewed March 18, 1921. Serial No. 453,475.

*To all whom it may concern:*

Be it known that we, MONTAGUE ADAIR, of borough of Brooklyn, county of Kings, city and State of New York, and WILLIAM PRESSCUSS SNYDER, of borough of Manhattan, city, county, and State of New York, both citizens of the United States, have invented certain new and useful Improvements in Machines for Hemstitching Fabrics, of which the following is a specification.

This invention relates to machines for hemstitching fabrics or the like and aims to provide certain improvements therein.

In certain prior applications by Montague Adair, individually or as a joint inventor with James A. Cameron and Franklin Ainsworth, are described a plurality of sewing machines (preferably two) which are mounted opposite each other and which are adapted to hemstitch two sides of a continuous strip of fabric. Means are provided in these constructions for automatically feeding the cloth to the machines; for automatically governing the relative speeds of the sewing operations of the two machines whereby to cause the fabric to travel evenly through the machines and means for automatically stopping both machines when a thread of either machine fails, and for automatically winding up the fabric.

The object of the present invention is to provide a mechanism of this type in which the machines are rendered more efficient in their operation and more simple in their construction. The invention includes other improvements which will be hereinafter more fully described.

Referring to the drawings which illustrate the invention in its preferred form,—
Figure 1 is a front elevation partly in section of the complete machine.

Fig. 3 is a vertical transverse section, approximately on the line 3—3 in Fig. 1.

Fig. 4 is an enlarged view of one of the machine heads showing several of the parts in section.
Fig. 5 is a view of part of Fig. 4 taken at right angles to the latter, some of the parts being broken away.

Fig. 6 is a plan showing the bobbin stop.

Fig. 7 is a front elevation of Fig. 6.

Fig. 8 is a sectional view of the magnetic stop clutch or transmitter.

Fig. 9 is a section of Fig. 8 taken on the line 9—9.

Fig. 10 is a view looking to the right in Fig. 8 with some of the parts omitted.

Fig. 11 is a sectional view of a part of the winding-up roll illustrated in Fig. 1.

Fig. 12 is a sectional view of a detail illustrating the circuit making and breaking ring of one of the machine heads.

Fig. 13 is an enlarged plan view showing certain parts omitted in Fig. 2.

Fig. 14 is a cross sectional view showing a part of the mechanism of the machine head.

Fig. 15 is a sectional view showing the relay switch.

Fig. 16 is a longitudinal sectional view of Fig. 14.

Fig. 17 is a detail view of the tension bars.

Fig. 19 is a detail view showing one of the guide bars.

Figure 1:
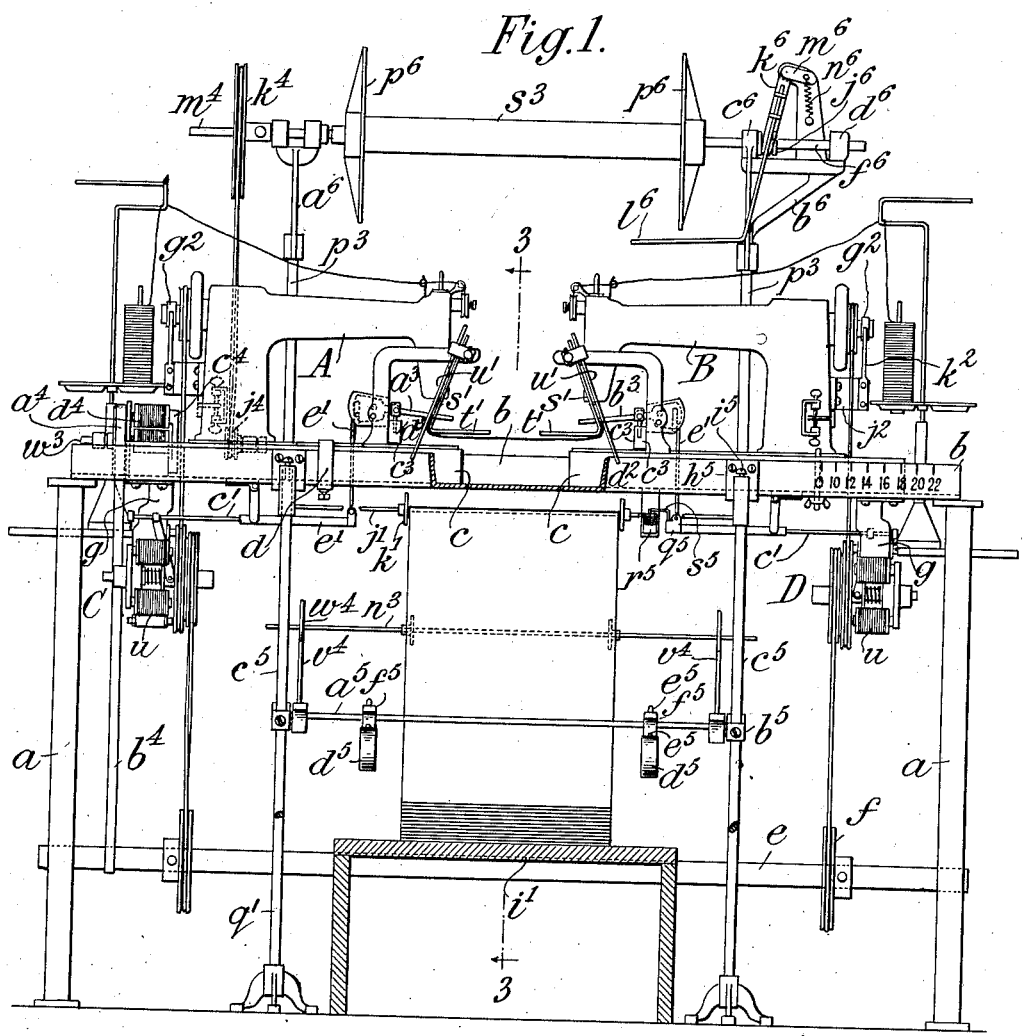

Referring to the drawings let A and B indicate two machine heads which are adapted to sew simultaneously two sides of a strip of fabric. In certain classes of work more than two machine heads may be used, and such machine heads may be of any desired type, depending upon the work to be performed. In the drawings we have illustrated our invention as applied to the hemstitching of a long strip of fabric in the manufacture of handkerchiefs, and the machines A and B are hence shown as hemstitching machines. Being designed to operate upon two sides of strips of fabric which may differ widely in width in the manufacture of handkerchiefs of different sizes, our invention includes a means for mounting the machine heads in such manner that they may be easily and quickly adjusted toward and away from each other. To this end we provide a plurality of standards $a$ $a$ upon the tops of which are mounted two beams $b$ $b$ which as shown are preferably constructed of L-shaped or angle iron so that there is formed a trough or channel between the two beams designed to receive the wooden bases or bed plates of the machine heads. These wooden bases which are indicated at $c$ are preferably constructed of wood and one is provided for each machine. The bed plates are of appropriate size to fit closely in the channel formed between the two beams $b$ $b$, and clamping plates $d$ are provided which are adapted to securely hold the bases in position. The clamping plates are fastened by means of screws or bolts so that they may be easily loosened and the bases quickly adjusted to their proper positions, a scale being provided if desired as shown. It will be understood that the machines are preferably so adjusted that their presser feet are closer together than the width of the fabric, so that the fabric is given a certain slackness in passing through the machines. In constructing a series of machines for factory purposes we customarily form the beams $b$ of long lengths and provide as many standards $a$ as may be necessary to adequately support them. We also provide a main shaft $e$ which may extend along the entire length of the series of machines and on the driving shaft we fit pulleys $f$ which are provided with clamping screws or nuts so that they can be adjusted in accordance with the position of the machine heads. Wide faced fixed pulleys may be employed in lieu of these, if desired.

It will be understood that the main shaft $e$ is constantly driven and that it is necessary to provide means whereby the machine heads are connected to the main shaft in such manner that they can be easily and quickly started and stopped. To this end we interpose between the main shaft and each machine head a magnetic clutch device which in the construction shown is controlled either by hand or by certain automatic stop devices. In the drawings the clutch devices or so-called "transmitters" are indicated by the reference letters C and D. In order that the clutch device may be always in proper alinement with the driving wheels of the machine heads, we prefer to mount each device upon the lower side of its appropriate base, utilizing for this purpose a bracket $g$ which is screwed or otherwise fastened as shown to the under side of the plate.

Both of the clutch devices are of the same construction, and one of them C is illustrated in detail in Figs. 8, 9 and 10. The bracket $g$ has fixed to its middle portion a horizontal shaft $h$ which is prevented from rotating within the bracket by a set screw $j$ shown in dotted lines in Fig. 8. Upon the bracket $g$ the rotating elements of the clutch device are mounted. Upon the shaft $h$ is mounted a sleeve $k$ the inner end of which is flanged at $l$ and bears against the side face of the bracket. Upon the sleeve $k$ are mounted two pulleys $m$ and $o$, the first of which $m$ is belted to the driving pulley $f$ on the shaft $e$ and hence constantly rotates. The second pulley $o$ is belted to the driving wheel of the machine head and rotates only when it is clutched to the pulley $m$. Between the two are preferably interposed a gasket $p$ or friction surface of leather or other suitable material. Between the flange $l$ of the sleeve $k$ and a flange $q$ formed on the inner side of the hub of the pulley $o$ is interposed a helical spring $r$ encircling the sleeve. The result of this construction is that normally the pulley $o$ is pressed against the pulley $m$ and hence partakes of its motion and drives the machine head. At the opposite end of the sleeve $k$ is provided a nut $s$ which prevents the pulley $m$ from being forced off the sleeve by the spring $r$. As thus described, it will be seen that when the two pulleys are clutched together by action of the spring $l$ they do not rotate upon the sleeve $k$ but on the contrary the sleeve $k$ rotates upon the fixed shaft $h$. As the sleeve $k$ is under no endwise pressure in either direction, it will be seen that during the driving of the machine heads there is no end thrust developed, which end thrust is a very serious detriment in this type of clutches. When, however, the pulley $o$ is moved to the left out of contact with the pulley $m$, whether this movement be occasioned by hand or by the operation of the magnets which are shortly to be described, the spring $r$ is put under considerable tension and the sleeve $k$ no longer rotates, the pulley $m$ being rotated upon the sleeve. As there is no clutching action at this time, there is no especial thrust in either direction.

For operating the device magnetically we prefer to provide a series (four are shown) of magnets $u$ $u$, which are mounted upon a spider or bracket $v$ fixed to the projecting end of the shaft $h$ by a set screw $v^7$ as shown in Fig. 10 or otherwise. Any convenient method of mounting the spider or any suitable way of supporting the magnets may be adopted. At the end of each arm of the spider one of the coils $u$ is connected by a nut or otherwise which may directly engage the core and pole piece of the magnet. When the magnets are energized they attract the pulley $o$ which is made of iron or steel, but in order to avoid the jarring effects upon the magnet we provide stops $w$ $w$ which as shown are adjustably mounted in the bracket $g$, against which stops the pulley is forcibly engaged when the magnets are energized. When this occurs not only is the pulley $o$ disconnected from the pulley $m$, but the magnets act as an energetic magnetic brake which brings the machine head to a stop very quickly but without jar.

It is preferable to provide a stop pin $y$ in the bracket $g$ and to slot the spider as shown so as to hold the spider in its proper position.

The magnetic clutch thus described is adapted to be operated electrically when the magnets are energized by the breakage of a thread, and preferably also by variations in speed of the two machine heads, as hereinafter described.

Means are also provided by means of which the machines may be stopped by hand, such means in its preferred form comprising a lever $a'$ pivoted to the bracket $g$ and having a yoke carrying rollers $b'$ adapted to bear against the flange $q$ on the pulley $o$ and thereby move the pulley $o$ away from its contact with the pulley $m$. The lever $a'$ is connected at its opposite end to a rod or link $c'$ (Fig. 1) which in turn is connected to a hand-operated lever $d'$ (Figs. 2 and 3) on the base of the machine head by any suitable system of levers, as for instance that shown at $e'$.

In order to provide for the lubrication of the clutch device, we prefer to form the shaft $h$ as a hollow shaft and drill the same with a series of holes leading to the exterior of the shaft. Oil is supplied to the shaft $h$ by a wick $f'$ (Fig. 8), the lower end of which extends into a receptacle $g'$ for the oil, said receptacle being hung on the outer end of the fixed shaft $h$, and being adjustable thereon to different angles, so that the bases may be tilted without spilling the oil.

In the construction shown the cloth $p^2$ to be sewn is preferably laid folded upon a table or support $i'$ (Figs 1 and 3) whence it is led over a fixed roller $j'$ carrying two guards or stops $k'$ designed to hold the cloth in alinement. Thence the cloth is led over a fixed or stationary roll $l'$, thence downwardly upon a similar roll $m'$ and thence upwardly over an adjustable roll $n'$. The two stationary rolls $l'$ $m'$ are preferably connected at each end by a cross piece $o'$, the cross pieces being preferably pivoted and adjustable angularly upon two sliding sleeves $p'$ which are adjustable along long standards $q'$ mounted in front of the machine. (See Fig. 17.) It will be noted that as the cloth passes over the stationary rolls $l'$ $m'$, it forms a loop, the inner portions of which contact so that at the contacting point the cloth is traveling in opposite directions. By this arrangement a slight angular adjustment of the stationary rolls gives any degree of tension which is required for the cloth, and smooths the same out so that it passes over the upper roll $n'$ in a perfectly flat, even, condition, and thence passes forward toward the machine heads.

By this arrangement the variations in feed are so slight that they are entirely negligible. It will be understood that in a machine of the present type it is necessary that the cloth be maintained at a correct tension not only on account of the sewing machines themselves, but also on account of the governing devices which are adapted to maintain the speed of the machine at such equality that the cloth passes evenly through both machines.

After passing over the top roll $n'$ the cloth is led through two guides $s'$ $s'$ (Fig. 1) located in advance of the respective hemmers, each of said guides being composed of an angular rod $t'$ having a horizontal portion under which the cloth is fed, and a more or less straight rod $u'$ slightly separated from the upper part of the rod $t'$. The edges of the cloth pass between the two rods of each guide and are turned upwardly and slightly toward each other before passing into the hem folders $v'$ (Fig. 3).

After being turned properly for the hem folders to form a hem on each side, the cloth runs under the presser feet of the two machine heads, and is hemstitched or otherwise stitched according to the character of work to be done.

The present invention includes a certain improved stop motion which is adapted to stop a machine when either its own thread or the thread of the other machine fails. Preferably the parts are constructed to stop both machines when a thread of either machine fails.

According to the present invention this stop mechanism is operated electrically in connection with the magnetic clutch heretofore described. In its preferred form an electric circuit is provided which is normally open so that no current passes therethrough until there is a breakage of the thread.

Referring first to Figs. 4 and 5, the thread $x'$ is shown as passing down over the thread retainer $y'$ around the tension $z'$, then downwardly through the thread controller $a^2$, thence through the take-up lever $b^2$, then downwardly to the needle $c^2$. In every cycle of the machine's operation the thread controller $a^2$ moves downwardly when the tension is relieved, and we utilize this downward movement to make a contact with an arm $d^2$ carried upon an insulating block $c^2$ fixed to the front of the machine head. Preferably a threaded rod $e^2$ passes through the block $c^2$ and forms an electrical connection between the arm $d^2$ and a conductor $f^2$. Referring now to Figs. 1 and 12 it will be seen that at the rear end of the main shaft of each machine is fixed a contact ring $g^2$ which, as shown in Fig. 12, is provided throughout a portion of its circumference (let us say three-fourths) with an insulating ring or segment $h^2$, while the remaining portion of its circumference comprises a conducting segment $i^2$ which is grounded through the machine head. Immediately below the end of the shaft is fixed a block of insulating material $j^2$ which carries a spring arm $k^2$ bearing upon the contact ring $g^2$. The spring arm $k^2$ is connected with a suitable source of current and this current is grounded through the machine head for about a quarter of each rotation of the main shaft of the machine. The contact ring is so set with reference to the thread controller $a^2$ (Figs. 4 and 5) that when the circuit is completed through the segment $i^2$ it is open through the controller $a^2$. Under normal working conditions therefore no current flows through the conductor $f^2$. When, however, the spool thread of the machine breaks (or slackens unduly if the bobbin thread fails), the thread control $a^2$ being no longer held up by the thread, makes contact with the arm $d^2$ and when the contact is next made through the spring arm $k^2$ and segment $i^2$, the circuit is completed thus causing the relay to operate and thereby closing the two circuits, one for each clutch or transmitter. In some cases the parts are modified so that one machine is stopped, either by the failure of its own thread or the failure of the thread of the opposite machine.

The construction which is described provides an extremely simple and compact stop motion for the machines. As the machines run at from 1600 to 1800 revolutions per minute, it will be observed that after a thread is broken the time within which the spring arm $k^2$ is in contact with the segment $i^2$ is extremely short. If it were attempted to directly energize the clutch magnets by the current passing through this contact the results would be unsatisfactory since these magnets are necessarily somewhat slow in their action and require a certain time to become energized. We therefore prefer to utilize a more sensitively constructed relay magnet for closing the main circuit through the magnetic clutches when the stop mechanism is to operate. Such relay is indicated at $l^2$ in Figs. 2, and 15. Its construction is well understood and it need not be fully described here. It is sufficient to say that when the relay magnet is energized, its armature is pulled downwardly so that its three points make contact with the mercury cups $m^2$, thus completing the main circuit which includes the magnetic clutches. The armature of the relay is provided with adjusting weights $n^2$ by which the force required to move it may be varied.

Our invention also provides an improved means for stopping one or both machines when a bobbin thread becomes exhausted or breaks. Such means are preferably adapted to be operated by the spool thread as shown in Figs. 4, 6 and 7. Referring first to Fig. 4, it will be seen that the cloth $p^2$ after passing under the presser foot is led upwardly over the inclined block $q^2$. Pivoted in this block is a shaft $r^2$ which carries an arm $s^2$, the end of which as shown in Fig. 4 lies just back of the presser foot of the machine and over the cloth $p^2$. The result of this construction is that when a bobbin thread fails, the fabric as it continues to feed backwardly carries with it the spool thread which lies along the top of the fabric and very shortly after the failure of the bobbin thread the needle in its upward movement will raise the arm $s^2$, thus rocking the shaft $r^2$ the presser foot being slotted or split to permit this movement of the thread. This movement is utilized to complete the circuit through the relay just described. This may be done very simply by the provision of a switch arm $t^2$ mounted at the end of the rock shaft $r^2$ which is moved backwardly between two contacts $u^2$ carried upon an insulating block $v^2$. This arm $t^2$ makes a wiping connection with the spring contact and is held in its closed position between the two.

It is sometimes desirable to provide an auxiliary or supplemental means for stopping the machines when the spool thread breaks, notwithstanding that other means are already provided for this purpose. In Figs. 4, 6 and 7 we have shown a simple device which is actuated by the bobbin thread to stop the machines when the spool thread fails. For this purpose the inclined block $q^2$ is slotted at $w^2$ so that the bobbin thread which lies beneath the cloth will pass into the slot if it is not caught by the spool thread as in the regular operation of the machine. The bobbin thread thus entering the slot presses downwardly upon an arm $y^2$ which is connected with the shaft $r^2$ and is depressed by the bobbin thread, thus rocking the arm $r^2$ and bringing the arm $t^2$ into engagement with the spring contacts $u^2$.

The main stopping mechanism for operating when a spool thread breaks, which has been heretofore described, is adapted to act very promptly, but should this fail for any reason the auxiliary or supplemental means just described will stop the machines before the fabric has traveled not more than a few inches.

On each side of the cloth means are preferably provided for governing the speed of the two machine heads whereby the fabric is fed evenly through the machines. These means preferably comprise two pivoted arms $a^3$ $b^3$ which rests upon the upturned edges of the fabric (see Figs. 1 and 13) each arm carry contact points $c^3$ which are normally held out of contact with the mercury cups $d^3$. When one machine is feeding faster than the other the fabric on the slower machine becomes slack, thus permitting the arm to drop in the mercury cup and the electric contact made. When this contact is made a circuit is completed through the magnetic clutch of the opposite (and faster) machine. This either stops the faster machine or slows it down until the slower machine has had an opportunity to catch up with it, thereby tightening the fabric and lifting the governor arm, thus breaking the circuit. When the latter is broken, the faster machine is again thrown into operation. The governing mechanism thus described does not differ essentially from that shown in application of Adair, Cameron and Ainsworth hereinbefore referred to.

Figure 18:
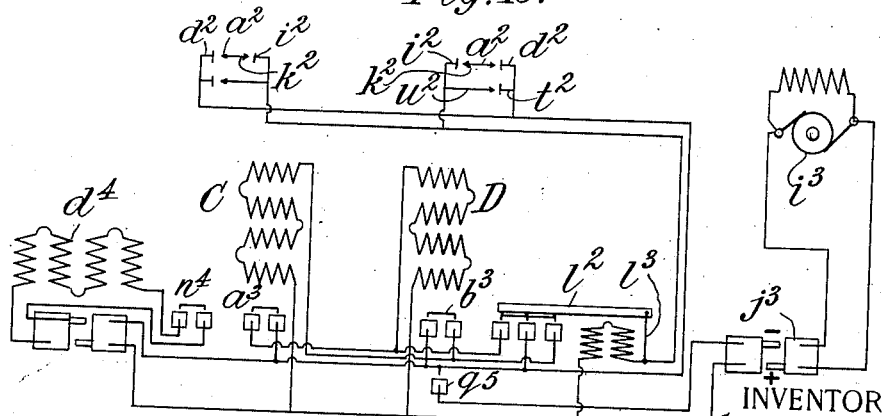
Fig. 18 is a diagrammatic view of the electrical circuits.

In Fig. 18 we have shown one form of electrical connections which are suitable for the stopping and governing means hereinbefore described. In this diagram $i^3$ represents any suitable source of current an $j^3$ a suitable plug switch which is in practice connected to one of the base plates of the machine heads. When a spool thread or a bobbin thread breaks the contacts $a^2$, $d^2$ or $u^2$ $t^2$ are connected and a circuit is completed through the coils of the relay $l^2$, thus closing the three-point switch and establishing a circuit through the coils of the clutch D. At the same time a circuit is completed through the coils of the clutch C. In order to maintain the relay switch in its closed position, we prefer to connect its coil with the switch bar by a shunt circuit as shown at $l^3$ so that enough current is passed through the relay coils to keep the same energized. This is desirable because of the fact that the relay is normally adjusted to move to its open position when not energized. While the machines are running, as before stated, the circuit through the relay is completed for only a short time in each revolution of the machine after the thread has broken and the machine may come to rest with one of its contacts broken. As the maintenance of the circuit through the magnetic clutch depends upon the maintaining of the relay switch closed, it is desirable to hold the latter down electrically. By connecting the relay directly with the switch as shown the relay magnets may be retained in saturated condition notwithstanding that the current is divided when the clutch magnets are switched in.

From Fig. 18 it will be seen that when the switch of the governer $a^3$ is closed a circuit is completed through the magnetic clutch D and when a circuit is made through the switch of the governor $b^3$ a circuit is completed through the magnetic clutch C. These circuits do not include the relay and hence the governors operate irrespective of the position of the relay. It would be possible to introduce a relay into the governor circuits, but we have found that this is not necessary since the governors operate comparatively slowly and the circuits are not interrupted by the rotation of the machine shafts as is the case with the stop mechanism.

Considerable difficulty has been encountered in the construction of a winding-up mechanism for the fabric which will wind the latter in a close, even roll and yet which will maintain upon the fabric the slight but even tension which is necessary to cause the fabric to travel properly through the machines. Referring to Fig. 3, the fabric $p^2$ after passing through the machines is led under a vertical movable roll or shaft $n^3$, the ends of which are guided between uprights $o^3$ $p^3$. Thence the fabric is led upwardly around the upper side of a stationary rod $q^3$, thence downwardly around the under side of a similar rod $r^3$ and thence to a winding-up roll $s^3$. The rods $q^3$ $r^3$ are similar in construction to the rods $l'$ $m'$ of the feeding mechanism, and the fabric is caused to wipe against itself in a similar manner to that already described in connection with the feeding mechanism. The rods $q^3$ and $r^3$ are mounted upon end pieces $t^3$ and by turning the end pieces precisely the right tension can be obtained for the fabric. Therefore when the roller $s^3$ is rotated, the fabric is wound upon it with any degree of tightness. If the roller $s^3$ could be rotated to a degree exactly corresponding to the feed of the machine satisfactory results might be obtained with the mechanism thus far described. The increasing size of the roller, however, and the unevenness in the feed through the machines render it desirable to introduce other mechanism into the combination thus described.

The winding-up roller $s^3$ is according to our invention rotated intermittently and this rotation is preferably controlled by the movements of the roll $n^3$. As the fabric is fed through the machine the roll is gradually lowered until it reaches a given point whereupon the mechanism is set in operation to rotate the winding-up roll $s^3$, which rotation continues until the roll $n^3$ reaches its upper limit of motion, whereupon the rotation of the winding-up roll is stopped. In the mechanism shown we provide at the rear of the machine a bracket $v^3$ (Fig. 2) in which is mounted a shaft $w^3$ carrying a loose pulley $a^4$ which is belted to the main shaft of the machine by a belt $b^4$ (see Fig. 3). Upon the shaft $w^3$ is fixed a spider $c^4$ (Fig. 2) carrying a series of electric magnets $d^4$ which are connected to contact rings $e^4$ $f^4$, upon which bear spring contact arms $g^4$ $h^4$ respectively. The parts are properly insulated so that when a current flows through the spring contact arms $g^4$ $h^4$ the magnets will be energized and the loose pulley $a^4$ clutched to the magnets and shaft $w^3$. Fixed upon the shaft $w^3$ is a small pulley $j^4$ which is belted to a pulley $k^4$ mounted upon a shaft $m^4$ (Figs. 1 and 11) which carries the winding-up roll $s^3$. It follows from this construction that when the magnetic clutch, which is described, is energized the winding operation of the fabric commences, which operation is continued until the clutch is deënergized. To control these operations, we provide a switch $n^4$ (Fig. 3) which is shown as mounted upon an upright $p^3$ and which has a projecting toe $o^4$ extending in the path of the roll $n^3$. The switch $n^4$ carries contacts which pass into and out of a mercury cup $p^4$, as best shown in Fig. 3. The switch $n^4$ is also counter-weighted as shown at $q^4$ (which counter-weight may be adjustable) to hold the switch in the position to which it is thrown. On the lower part of the standard $p^3$ is provided a pivoted arm $r^4$ which is also provided with a toe $s^4$ designed to be operated by the roll $n^3$. This arm is connected with the arm of the switch $n^4$ by a rod $t^4$ as illustrated.

Assuming that the machine is in operation and the roll $s^3$ stationary, the movable roll $n^3$ moves downwardly as the fabric is fed through the machines until it contacts with the toe $s^4$ of the lever $r^4$ which throws the switch $n^4$ forwardly, thus completing the electrical circuit and causing the magnetic clutch to operate and the winding-up roll to be turned. As the fabric is wound up the roll $n^3$ moves upwardly until it contacts with the toe $o^4$ of the switch $n^4$, and throws the same backwardly, thus breaking the circuit and stopping the rotation of the winding-up roll.

Any suitable electrical connections may be provided for operating the magnetic clutch of the winding-up roll. One simple system is shown in a diagram of Fig. 18 wherein such clutch (indicated by the reference letter $d^4$) is mounted in parallel arrangement with the driving clutches. The switch $n^4$ is indicated in this diagram by the same reference letter.

Our invention also includes a means for easily and quickly mounting a roll $s^3$ in position to receive the fabric so that as soon as one roll is filled another may be quickly substituted for it. In the form of our invention illustrated (see Figs. 1 and 11) the shaft $m^4$ carries at its end a device for engaging the one end of the roll $s^3$ as shown. The shaft $m^4$ is mounted in bearings formed on a bracket $a^6$ which is mounted at the top of one of the uprights or standards $p^3$. Upon the other standard $p^3$ is fixed a bracket $b^6$ which is provided with two bearings $c^6$ $d^6$ in which is mounted a short shaft $f^6$ having at its inner ends provisions for engaging the opposite ends of the roll $s^3$. The inter-engaging provisions referred to may consist of any suitable means for providing a non-rotative connection between the roll and shaft $m^4$. A similar means may be used between the roll and shaft $f^6$. In the construction shown the roll (Fig. 11) is slotted at $g^6$ and the shafts are provided with projections $h^6$ designed to enter the slots in the roll. The shaft $f^6$ is slidable in its bearings, and is provided with a collar $j^6$ which is engaged by a pivoted yoke $k^6$ to which is affixed an operating handle $l^6$ by means of which the yoke may be swung to move the shaft backward and forward. The yoke $k^6$ has connected to it a short arm $m^6$ connected by a spring $n^6$ to a fixed portion of the bracket $b^6$, such spring tending to normally maintain the shaft in its forward or engaging position. To remove the roll $s^3$, it is necessary only to throw back the handle $l^6$ and a new roll may be easily inserted. In order to provide gages for guiding the fabric so that it is wound evenly upon the roll, we provide circular flanges or disks $p^6$ on each of the shafts $m^4$ and $f^6$, the disks being preferably formed in one casting with the projections $h^6$ as shown. By this means one set of gages or guides serves for as many rolls as are used.

We have found in practice that it is very desirable to provide means for holding the roll $n^3$ in a horizontal position at all times, irrespective of its vertical position. This prevents any jamming of the roll, and furthermore it tends to prevent uneven winding, due to a difference in tension of the sides of the fabric. Any suitable means may be employed for accomplishing this result, but we prefer to provide at each end of the roll $n^3$ (Figs. 1 and 3) guiding arms $v^4$, each of which arms is formed with a slotted portion $w^4$ at its free end, in which slotted portion the shaft of the roll $n^3$ works. The two arms $v^4$ are pivoted in such manner that they are not capable of relative motion, but act together upon the roll $n^3$. Preferably these arms are mounted on a rock shaft $a^5$ (Fig. 1) which is pivoted in adjustable bearings $b^5$ mounted to slide upon uprights $c^5$. Set screws or other means are provided to hold the bearings $b^5$ in their adjusted positions. We prefer to provide counterweights for the arms $v^4$ in order to accurately adjust the downward tension upon the roll $n^3$. As shown these counter-weights (which are indicated at $d^5$) are fixed upon short rods $e^5$ which are adjustable in blocks $f^5$ fixed to the shaft $a^5$. With the construction just described neither arm $v^4$ is capable of moving rotatively relatively to the other so that the roll $n^3$ is maintained in a horizontal position irrespective of variations in slack of the fabric passing under it.

Figure 2:
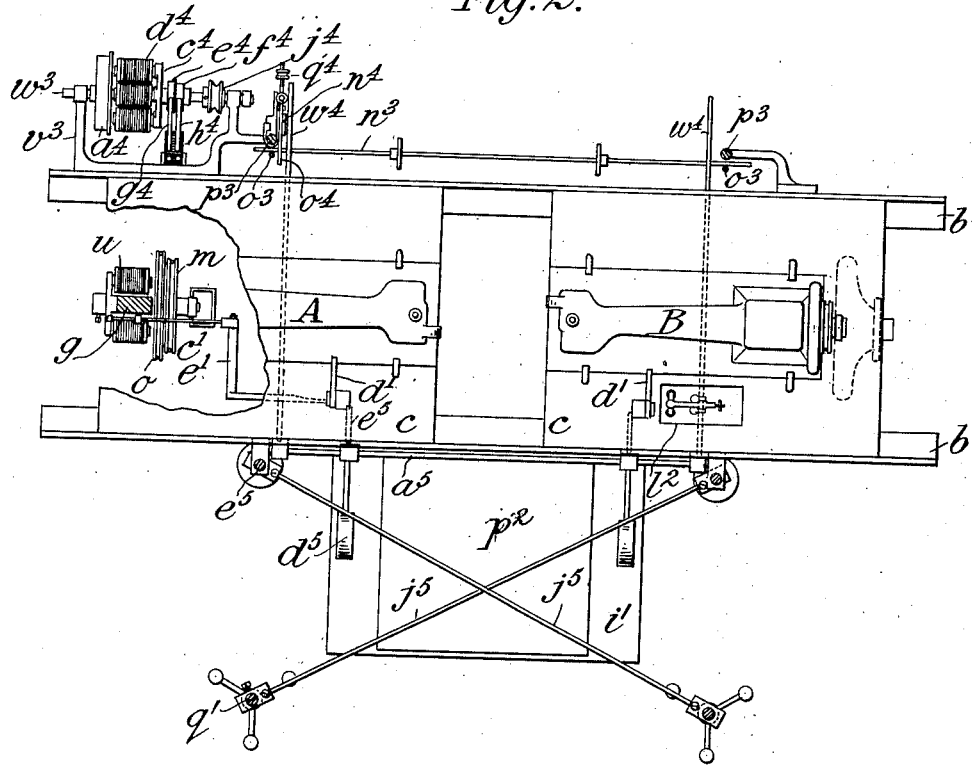
Fig. 2 is a plan view of the machine partly in section with the winding-up roll and several other parts omitted.

The machines when in operation are apt to set up considerable vibration which is more or less objectionable, and in the construction shown we utilize the upright rods or standards $c^5$ to check this vibration as much as possible. It will be seen in Figs. 1 to 3 that the rods at their upper ends pass within a recessed bracket $h^5$ which is fixed to the front of the frame $b$. In each bracket is mounted a set screw $i^5$ which passes downwardly through the upper side of the recessed bracket and bears against the upper end of the rod $c^5$. By tightening this screw the rods $c^5$ are placed under compression so as to support the frame at intermediate points between the uprights $a$. In order to avoid as much vibration of the standards $q'$ as possible, we prefer to connect these standards with the rods $c^5$ by crossed rods or trusses $j^5$ $j^5$ as best seen in Fig. 2. These rods $j^5$ may be adjustable telescopically or otherwise so as to secure the maximum bracing effect.

Our invention also includes certain improvements in the sewing machines proper by which the operation of such machines is considerably improved. According to the present methods of constructing machines of the hemstitching type it is necessary to turn back the machine heads and expose the under gearing at very short intervals in order to keep the same properly oiled. When such machines are run without auxiliary or supplemental mechanism, this is not so serious a disadvantage, but in machines which form a part of systems like the present wherein they are in combination with other mechanism and wherein there is a strip of fabric of indefinite length passing through the machines at nearly all times, it is a great disadvantage to stop the machines, remove the fabric, displace any other connected mechanism and turn back the machines for oiling. In order to avoid this, we have mounted underneath each machine an oil receptacle which is best shown in Figs. 14 and 16. This receptacle, which is lettered $n^5$, is preferably in the form of a pan having a flange $o^5$ resting upon the wooden base of the machine. This pan is adapted to receive all of the depending gearing and shafting of the machine head, and is designed to be kept supplied with oil or other lubricant to about the level indicated. A given part of the mechanism is hence revolving in oil while that which is not is completely lubricated by the remainder of the mechanism or by splashing from the oil pan. It is necessary or desirable, however, to protect the bobbin chamber from oil in order that oil may not be splashed up into the bobbin and through the feeder points onto the fabric. This we accomplish in the present construction by providing a shield or the like $p^5$ which effectually prevents the passage of oil to the shuttle and fabric. We have found in practice that aside from the convenience of oiling, a very marked increase in the efficiency of the machines ensues from this feature of our invention. By it we are enabled to obtain a considerably greater speed of a given machine than has heretofore been found practicable.

In the operation of our improved machine it is practically essential or desirable that both machine heads shall be under the complete control of the operator by means of hand-operated or similar parts, and that such machines shall be controllable each independently of the other. This is attained in the present construction by the handles $d'$ before referred to, each of which controls its own driving clutch C or D. It is desirable to utilize one of these handles to operate a switch or circuit breaker by means of which the entire machine may be cut out of circuit, so that no automatic action can take place under these circumstances. In Fig. 1 we have shown a switch $q^5$ adapted for this purpose. This switch comprises essentially a mercury cup $r^5$ mounted upon a suitable bracket fixed to the base of the machine head and contacts $s^5$ carried upon or connected to one of the shifting rods $c'$ which are connected to the manually controllable handle of the machine head B. In the diagram of Fig. 18 this switch or circuit breaker is indicated by the reference letter $q^5$.

Our invention also includes means for turning the hem in the fabric, means for adjusting the hem-turning means to obtain various widths of hem and to adjust the hemmer.

Figure 20:
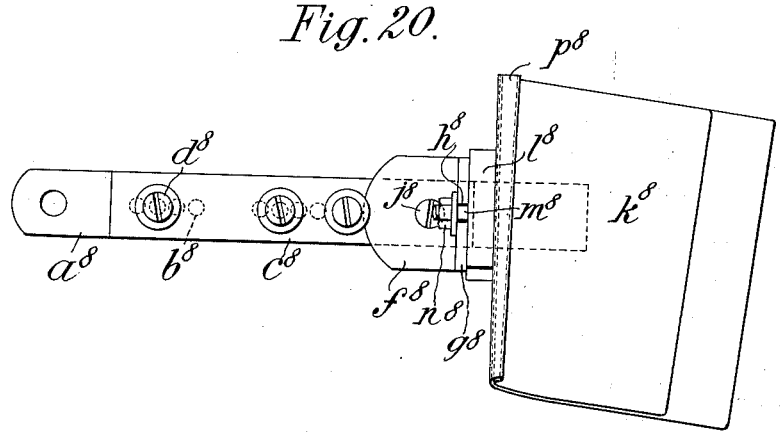
Fig. 20 is a plan view of one of the hemmers.
Figure 21:
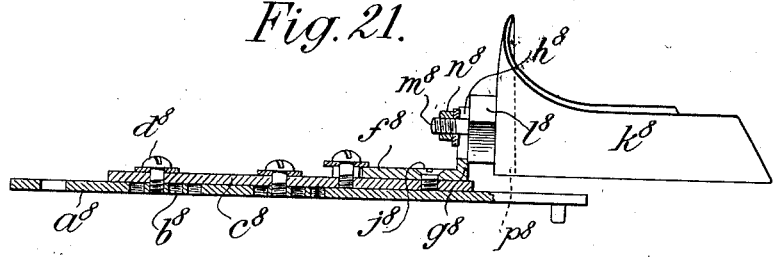
Fig. 21 is a side elevation of Fig. 20.

In Figs. 20 and 21, wherein this feature of our invention is illustrated, $a^8$ is a bed plate adapted to be fixed to the machine head and provided with a series of holes $b^8$. Superposed upon this plate is an adjustable plate $c^8$ which is provided with a series of screws $d^8$ adapted to engage the holes $b^8$ whereby the plate $c^8$ can be adjusted in various positions. At the end of the plate $b^8$ is a rotary bracket $f^8$ having a flange $g^8$ formed with a slot $h^8$. The bracket $f^8$ is adapted to turn about a screw pivot $j^8$ and to be adjusted at various angles relative to the plate $c^8$. A hem folder or hemmer $k^8$ is preferably mounted upon a block $l^8$ which has fixed to it a bolt $m^8$ fitting in the slot $h^8$ and held in its adjusted positions by a nut $n^8$. By this means the hem folder $k^8$ may be tilted up or down, or to the left or right in order to accurately position it with reference to the presser foot and needle. Moreover, it may be moved bodily longitudinally of the plate by adjusting the position of the plate $c^8$.

The hem folder $k^8$ may according to our invention be constructed to turn a single fold. When so constructed we prefer to make the hem folder of a single piece of sheet metal doubled upon itself as shown and then turned again at its folded side as illustrated at $p^8$ at one end of the folder and being curved at the opposite end as best illustrated in Fig. 21. This form of hemmer is particularly adapted for use in combination with the feeding devices hereinbefore referred to. By this combination we are enabled on the selvage side of the cloth to turn a single fold and hemstitch along the selvage edge without the necessity of turning in an extra fold. This results in some saving of cloth and provides an accurate and even hemstitched hem.

An important feature of improvement in connection with the device herein described is the construction of the various mercury cups used with or forming part of the various switches. These cups consist essentially of fiber provided with an electrical connection such as the screw binding post $s^8$ illustrated for instance in Fig. 15. Much better results can be obtained by this construction than by the use of metallic cups since the mercury does not act upon the fiber. The switch is hence more durable.

What we claim is:—

1. In an automatic sewing machine or the like, the combination of a pair of non-rotative bars over which the fabric is led, an adjustable edge turning device for turning up the side of the fabric, said edge turning device comprising a pair of rods mounted to turn the edge of the fabric, one of said rods having an angular portion overlying the body of the fabric, a hem folder comprising a scroll member having a tapering portion from the entrance toward the exit, and said hem folder having a wide upper plate adapted to lie across the top of the fabric, and a take-up mechanism comprising a freely movable rod beneath which the cloth passes, and means for removing the surplus cloth beyond said rod.

2. In an automatic sewing machine or the like, the combination of a tension device for the cloth, an edge folding device arranged at the rear of said tension mechanism, said edge folding device comprising a pair of bars adapted to turn the edge of the cloth, one of said bars having a portion extending substantially horizontally across the cloth, means for adjusting said last-named bar, a hem folder receiving the up-turned edge of the cloth, a sewing mechanism, and a take-up device for moving the cloth away from said sewing mechanism, said devices being arranged in the order named.

3. In an automatic sewing machine or the like, the combination of a tension device, an edge turning device at the rear of said tension device, a hem folding device at the rear of said tension device, said hem folding device having two plate members bent to scroll form, the front edge of said hem folder being inclined upwardly substantially at right angles to the body portion, and the hem folder being bent upon itself at its rear or folding end, and said hem folder having a wide bottom plate and a wide top plate extending transversely across the top of the cloth at the front and rear ends of the folder, whereby the cloth is accurately maintained in the folder, a sewing mechanism, and a take-up device adapted to move the cloth away from the sewing mechanism.

4. In an automatic sewing machine or the like, the combination with the sewing mechanism of a pair of non-rotative bars over which the fabric is led, an adjustable edge turning device for turning up the side of the fabric, said edge turning device comprising a pair of rods mounted to turn the edge of the fabric, one of said rods having an angular portion overlying the body of the fabric, a hem folder comprising a scroll member having two plates bent to scroll form, the front edge of said hem folder being inclined upwardly and the hem folder being bent upon itself at its rear or folding end, and said hem folder having a wide top plate extending transversely across the top of the cloth at the front and rear ends of the folder, and a take-up mechanism comprising a freely movable weighting rod adapted to rest on the cloth, and means for removing the surplus cloth beyond the rod, said means acting to intermittently lift the rod.

5. In an automatic sewing machine or the like, the combination with the sewing mechanism of a pair of non-rotative bars over which the fabric is led, an adjustable edge-turning device for turning up the side of the fabric, said edge-turning device comprising a pair of rods mounted to turn the edge of the fabric, one of said rods having an angular portion overlying the body of the fabric, means for adjustably holding said rods whereby they are capable of independent adjustment, a hem folder comprising a scroll member having two plates bent to scroll form, the front edge of said hem folder being inclined upwardly, and the hem folder being bent upon itself at its rear or folding end and said hem folder having a wide top plate extending transversely across the top of the cloth at the front and rear ends of the folder, and a take-up mechanism comprising a freely movable weighting rod adapted to rest on the cloth, and means for removing the surplus cloth beyond the rod, said means acting to intermittently lift the rod.

6. In an automatic sewing machine or the like, the combination with the sewing mechanism of a pair of non-rotative bars over which the fabric is led, means for adjusting the pair of bars to alter the tension on the fabric, an adjustable edge-turning device for turning up the side of the fabric, said edge-turning device comprising a pair of rods mounted to turn the edge of the fabric, one of said rods having an angular portion overlying the body of the fabric, a hem folder comprising a scroll member having two plates bent to scroll form, the front edge of said hem folder being inclined upwardly and the hem folder being bent upon itself at its rear or folding end, and said hem folder having a wide top plate extending transversely across the top of the cloth at the front and rear ends of the folder, and a take-up mechanism comprising a freely movable weighting rod adapted to rest on the cloth, and means for removing the surplus cloth beyond the rod, said means acting to intermittently lift the rod.

7. In an automatic sewing machine or the like, the combination with the sewing mechanism of a pair of non-rotative bars over which the fabric is led, an adjustable edge-turning device for turning up the side of the fabric, said edge-turning device comprising a pair of rods mounted to turn the edge of the fabric, one of said rods having an angular portion overlying the body of the fabric, a hem folder comprising a scroll member having two plates bent to scroll form, the front edge of said hem folder being inclined upwardly and the hem folder being bent upon itself at its rear or folding end, and said hem folder having a wide top plate extending transversely across the top of the cloth, means for mounting said plate adapted to permit it to tilt upwardly and downwardly and in a sidewise direction, and a take-up mechanism comprising a freely movable rod beneath which the cloth passes, and means for removing the surplus cloth beyond said rod.

In witness whereof, we have hereunto signed our names in the presence of two subscribing witnesses.

MONTAGUE ADAIR.
                 WILLIAM PRESSCUSS SNYDER.

Witnesses:
   EUGENE G. MYERS,
   THOMAS F. WALLACE.